Nov. 9, 1926.
W. E. PHILLIPS, JR., ET AL
PEDAL ATTACHMENT FOR MOTOR VEHICLE DIRECTION SIGNALS
Filed June 3, 1925
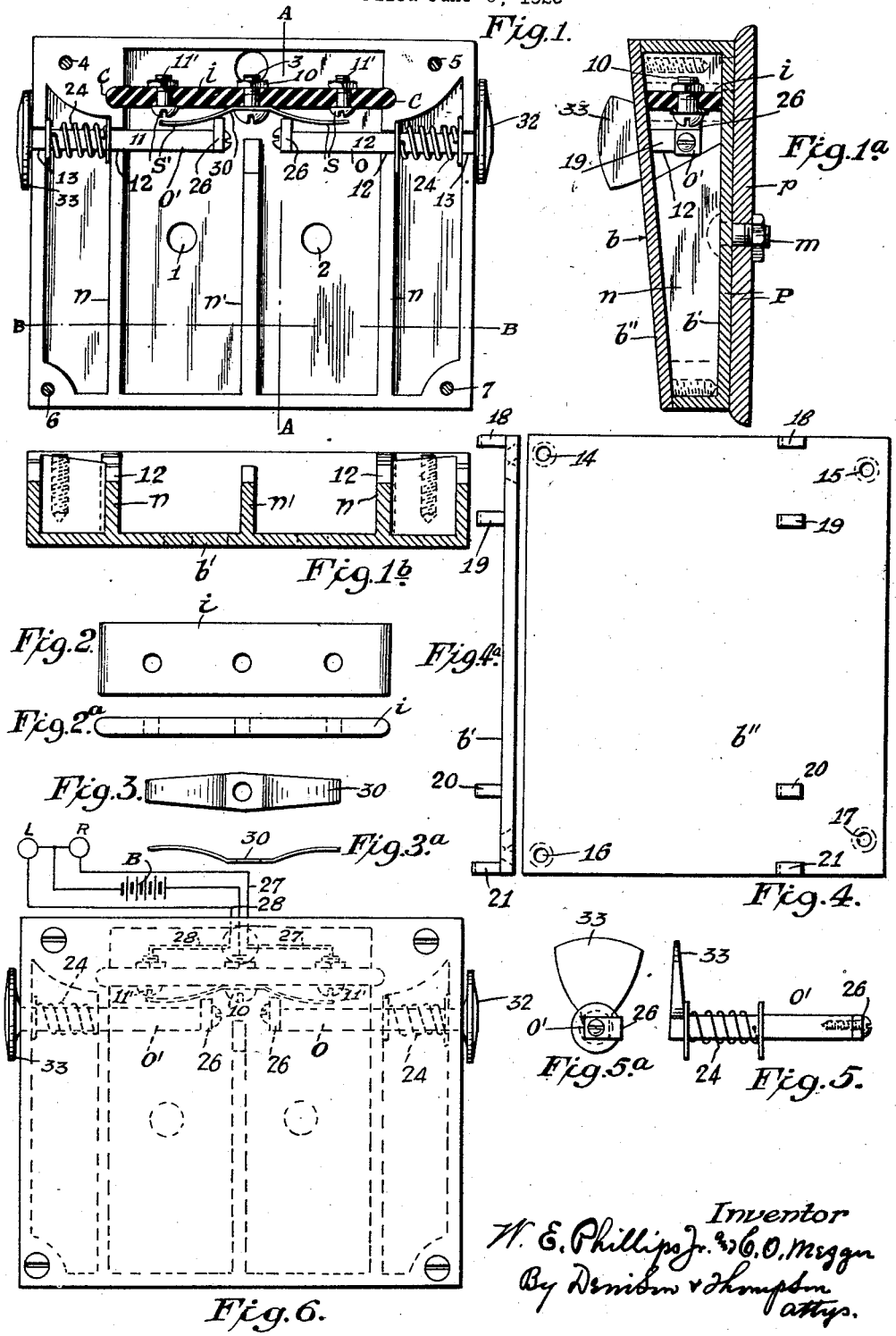

Patented Nov. 9, 1926.

1,605,982

UNITED STATES PATENT OFFICE.

WILLIAM E. PHILLIPS, JR., OF SYRACUSE, NEW YORK, AND CLARENCE O. MEZGER, OF SPRINGFIELD, OHIO.

PEDAL ATTACHMENT FOR MOTOR-VEHICLE DIRECTION SIGNALS.

Application filed June 3, 1925. Serial No. 34,722.

This invention relates to a pedal attachment for directional-signal-operating device for motor vehicles to signal pedestrians, traffic officers and drivers of other machines the intention of the driver to turn to the right or left and is preferably used in connection with distinctive electric signals having suitable characters or colors to indicate the turning direction.

It is found that most of the operators of motor vehicles drive with the left foot resting lightly against the clutch pedal for emergency control of the car, particularly in congested traffic conditions, and the main object of the present invention is to provide such pedal with laterally movable members, one for each signal, adapted to be operated at will independently of each other for selectively closing the circuits through their respective signal lamps.

Other objects and uses relating to specific parts of the device will be brought out in the following description.

In the drawings:

Figure 1 is a face view of a section of an automobile pedal with the cover plate removed to show the interior mechanism.

Figure 1$^a$ is a transverse sectional view taken on line $a$—$a$, Figure 1, except that the cover plate is shown in operative position thereon.

Figure 1$^b$ is a longitudinal sectional view taken on line $b$—$b$, Figure 1.

Figures 2 and 2$^a$ are respectively a face view and an edge view of the detached insulating bar for supporting the electric switches.

Figures 3 and 3$^a$ are respectively a face view and an edge view of the detached switch spring.

Figures 4 and 4$^a$ are respectively a face view and an edge view of the detached cover plate.

Figures 5 and 5$^a$ are respectively a side elevation and an end view of one of the detached switch operation members.

Figure 6 is a face view of the pedal box section with the parts thereon, showing also diagrammatically the right and left signal lamps.

As illustrated, this device comprises a clutch pedal —$p$— consisting in this instance of the tread —$p$— of the usual clutch pedal lever and a box section —$b$— for receiving and supporting an insulating bar —$i$—, which, in turn, carries a pair of electric switches —$s$— and —$s'$—, said box section being also provided with means for receiving and supporting a pair of laterally movable switch operating members —$o$— and —$o'$—, one for each signal as —R— and —L— shown in Figure 6.

The box section —$b$— preferably comprises a base —$b'$— and a cover —$b''$—, the base section —$b'$— being secured to the pedal section —$p$— by suitable clamping bolts —$m$— which are passed through openings —1— and —2— in the base section —$b'$—.

The cover plate —$b''$— is secured to the open side of the base section —$b'$— by means of screws —4—, —5—, —6— and —7— near the corner thereof and constitutes what may be termed the pedal plate adapted to be engaged by the foot of the operator and for this purpose is inclined at an angle to the base —$b'$— and —$p$— as shown in Figure 2.

The base section —$b'$— is also reinforced at intervals by spaced ribs —$n$— and —$n'$— to enable the box section to be made as light as possible without sacrificing its strength and durability.

The insulating block —$i$— is preferably made in the form of a more or less flat plate of vulcanized fibre or other suitable insulating material and is preferably provided with rounded ends seated in suitable recesses —$c$— in the inner faces of the outer ribs —$n$— as shown in Figure 1 and is held in place by the cover plate —$b''$— as shown in Figure 1$^a$.

The electric switches —$s$— and —$s'$— preferably consist of a single bow spring leaf —30— having its intermediate portion secured to the lower face of the insulating block —$i$— by means of a clamping bolt —10— and its opposite ends extended across the lower ends of a pair of contact members —11— which are also secured to the insulating bar —$i$— at opposite sides of and equal distances from the clamping bolt —10—, the ends of said spring leaf —30— being tensioned to normally spring away from the contact members —11— and —11'— and thereby to normally break the circuits through their respective lamps —R— and —L—.

The switch operating members —$o$— and —$o'$— are preferably made in the form of laterally elongated bars which, in this instance, are square or angular in cross section and are slidable in suitable slots —12— and —13— in the rear face of the base section —b'— so as to be able to slide freely therein without turning.

These bars —o— and —o'— extend laterally in opposite directions from the inner end of the clamping bolt —10— and are provided at their inner ends with offset portions —26— for engaging the adjacent downwardly deflected ends of the switch member —30— and forcing them into contact with their respective terminals —11— and —11'— when the rods —o— and —o'— are moved laterally and outwardly in their respective guide openings —12— and —13—.

The outer ends of the rods —o— and —o'— are provided with upwardly projecting wings or flanges —32— and —33— adjacent the outer end faces of the box section —b— and are adapted to be engaged and moved outwardly independently of each other against the action of the retracting springs —24— by the engagement of the foot of the operator therewith when resting lightly upon the cover plate —b"—.

The cover plate —b"— is provided with lugs —18—, —19—, —20— and —21— adapted to enter the slots —12— and —13— in the base section —b— for holding the switch operating rods —o— and —o'— against displacement therefrom when the cover is secured in operative position.

The lamps —R— and —L— are supplied with current from the battery —B—, Figure 6, which is also connected to the clamping screws —10— to connect the switch member —30— in the battery circuit, the terminals —11— and —11'— being connected by wires —27— and —28— to their respective lamps —R— and —L— as shown in Figure 6.

The cover plate —b"— is provided with suitable bolt holes —14—, —15—, —16— and —17— for receiving the bolts —4—, —5—, —6— and —7—.

Operation.

When the box —b— is clamped in operative position upon the pedal —p— and the switches —s— and —s'— are connected to the battery —B— and other signal lamps —R— and —L— the outward movement of either one of the rods —o— or —o'— by the engagement of the foot of the operator with the corresponding flange —32— will close the switch of the corresponding lamp which in turn, will indicate to pedestrians, traffic officers, and drivers of other machines, the intention of the operator to turn in the direction indicated by the signal.

When the foot of the operator is resting lightly upon the pedal plate —b"—, it may be easily moved laterally in either direction for shifting the corresponding switch operating bar. That is, by moving it to the right to operate the member —o— will operate the right hand signal —R— while the movement of the foot to the left will shift the other switch operating member —o'— to energize the corresponding left hand lamp —L—.

If it should be desired to remove any of the parts within the case —b— it is simply necessary to remove the cover plate —b"— which permits the insulating bar —i— with the switches thereon to be withdrawn from the seats —c— while the switch operating members —o— and —o'— may be similarly withdrawn from their respective slots —12— and —13—.

On the other hand, when assembling the parts, these operations are reversed and the cover plate secured in operative position to hold the interior parts in place.

What we claim is:

A pedal attachment for motor-vehicle direction-signals comprising a switch box having means for attaching it to one of the control pedals of a motor vehicle, an insulating bar supported within the box, switch terminals mounted on the insulating plate in spaced relation, a switch member secured to the insulating plate between said terminals and provided with laterally extending resilient parts movable into and out of contact with the terminals and normally tensioned to spring out of contact with the terminals and separate devices slidable endwise in opposite sides of the box and each operable at will independently of the other, said devices being provided with means for engaging their respective resilient members for forcing them into engagement with their corresponding terminals when moved in one direction, said terminals being provided with means for electrical connection with distinctive signal lamps.

In witness whereof we have hereunto set our hands this 22 day of May 1925.

WILLIAM E. PHILLIPS, Jr.
CLARENCE O. MEZGER.